US012372392B2

(12) United States Patent
Huddleston

(10) Patent No.: US 12,372,392 B2
(45) Date of Patent: Jul. 29, 2025

(54) ADJUSTABLE METER FLANGE COUPLING

(71) Applicant: The Ford Meter Box Company, Inc., Wabash, IN (US)

(72) Inventor: Robert W. Huddleston, Twelve Mile, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 347 days.

(21) Appl. No.: 18/169,305

(22) Filed: Feb. 15, 2023

(65) Prior Publication Data
US 2024/0271981 A1 Aug. 15, 2024

Related U.S. Application Data

(60) Provisional application No. 63/311,174, filed on Feb. 17, 2022.

(51) Int. Cl.
*G01F 15/18* (2006.01)
*F16K 27/06* (2006.01)
(52) U.S. Cl.
CPC .......... *G01F 15/185* (2013.01); *F16K 27/067* (2013.01)
(58) Field of Classification Search
CPC ...... G01F 15/185; G01F 15/005; G01F 15/14; G01F 15/18; F16K 27/067
See application file for complete search history.

(56) References Cited

U.S. PATENT DOCUMENTS

| 1,107,532 | A | | 8/1914 | Lofton | |
| 5,052,721 | A | * | 10/1991 | Gorman, Jr. | .......... G01F 15/185 |
| | | | | | 285/31 |
| 6,056,329 | A | * | 5/2000 | Kitani | ...................... F16L 27/12 |
| | | | | | 285/302 |
| 6,945,512 | B2 | * | 9/2005 | Carpenter | ............... F16L 27/12 |
| | | | | | 285/133.11 |

(Continued)

FOREIGN PATENT DOCUMENTS

| CN | 204139248 U | 2/2015 |
| CN | 107631092 A | 1/2018 |

(Continued)

OTHER PUBLICATIONS

EWE Water Meter Systems; https://www.ewe-armaturen.de/fileadmin/ewe-downloads/prospekte/p-gb_water-meter-systems.pdf; Mar. 2016.

(Continued)

*Primary Examiner* — Francis C Gray
(74) *Attorney, Agent, or Firm* — Barnes & Thornburg LLP

(57) ABSTRACT

A meter box that illustratively includes a first coupling is provided. The first coupling is located adjacent the meter box. The first coupling includes a coupling body. The first coupling includes an extension assembly. The extension assembly includes a neck that is in fluid communication with the coupling body. The neck of the extension assembly is movable with respect to the coupling body and configured to selectively create a space. The extension assembly includes a collar, a portion of which is spaced apart from the neck with a slot located therebetween. A portion of the coupling body is located within the slot. The space is sufficient to allow a fluid meter to be installed or removed between the first coupling and the second coupling.

20 Claims, 14 Drawing Sheets

(56) References Cited

U.S. PATENT DOCUMENTS

| | | | | |
|---|---|---|---|---|
| 8,313,607 | B2* | 11/2012 | Quinn | F16L 25/12 285/31 |
| 8,764,066 | B1* | 7/2014 | Rice | F16L 27/12 285/302 |
| 11,609,112 | B2 | 3/2023 | Huddleston | |
| 2009/0188313 | A1* | 7/2009 | Ball | G01F 15/14 285/239 |

FOREIGN PATENT DOCUMENTS

| CN | 108553661 A | | 9/2018 | |
|---|---|---|---|---|
| CN | 210600237 U | * | 5/2020 | |
| JP | 3845586 B2 | | 11/2006 | |
| JP | 4503278 B2 | | 7/2010 | |
| JP | 2018096100 A | | 6/2018 | |
| KR | 100351313 B1 | | 3/2004 | |
| KR | 100391390 B1 | | 3/2004 | |
| KR | 2020010159 A | * | 1/2020 | F16K 1/32 |

OTHER PUBLICATIONS

Reliance Worldwide Corporation (UK) Ltd. Product Guide 2018; www.rwc.co.uk.

Telescoping Meter Flange: Improving the Industry 1/4" at a Time—A.Y. McDonald (aymcdonald.com); Water Works, Innovation; Nov. 28, 2017.

Submittal Information; Crescent Box—(CB111-xxx-NL-style); Female Iron Pipe TH RE AD Inlet and Outlet; Straight Bras S Inlet Valve By Straight Female Iron Pipe Outlet—The Ford Meter Box Company, Inc.; May 22, 2014.

Submittal Data Sheet; NL Ball Style Beter Stop—7E4604B; AY McDonald Mfg. Co.

* cited by examiner

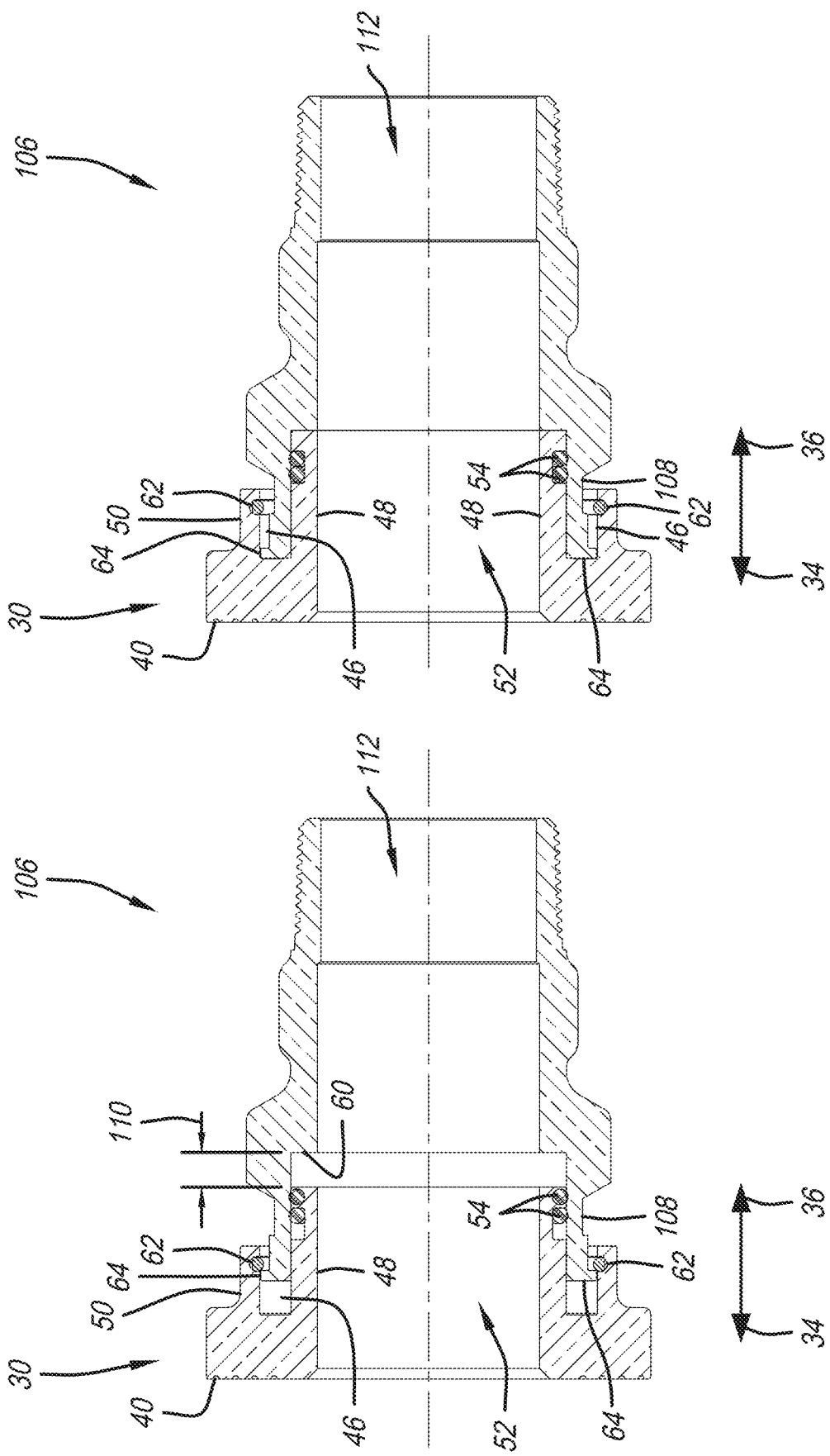

ADJUSTABLE METER FLANGE COUPLING

RELATED APPLICATIONS

The present Application relates to and claims priority to U.S. Provisional Patent Application, Ser. No. 63/311,174, filed on Feb. 17, 2022. The subject matter disclosed in that Provisional Application is hereby expressly incorporated into the present Application.

TECHNICAL FIELD AND SUMMARY

The present disclosure is directed to water meters inside water meter boxes or the like and, particularly, to connections that create a tolerance when installing or removing a water meter.

Water meter boxes are enclosures typically placed in the ground outside of a building, house, or dwelling. Such a water meter box contains a water meter that is used to determine the volume of water that enters the building, house, or dwelling. By placing the box with a meter in the ground, the meter can be protected from freezing weather and other environmental hazards. The meter box includes a lid that can be lifted to allow the meter to be read or serviced.

Typically, there is a valve coupling and an outlet coupling installed on the meter box. The valve coupling extends through the meter box and is configured to attach to a water source. The outlet coupling, likewise, extends through the meter box, typically opposite the valve coupling and is configured to connect to the water circuit inside the dwelling. The valve assembly in the valve coupling opens and closes to selectively control water flow that will enter the dwelling. Located between the valve coupling and outlet coupling is the water meter to determine the volume of water entering the dwelling. It is not uncommon for such water meters to be removed, reinstalled, or replaced. To do this, it is necessary for the meter to attach or detach from the valve coupling and outlet coupling. Conventionally, the openings of the water meter each include a flange extending therefrom sized to mate to a corresponding flange on the valve coupling and outlet coupling, respectively. The meter's flange on its inlet side abuts and fastens to the corresponding flange of the valve coupling. Similarly, on the water meter's outlet side, its flange abuts and fastens to the corresponding flange on the outlet coupling.

Being fastened to both the valve and outlet couplings holds the water meter in place, as well as maintaining fluid communication from the valve coupling, through the water meter, and out through the outlet valve towards the water circuit in the dwelling. A result is often a tight fit between the structures inside the meter box. This may cause difficulty while installing or removing a water meter. Because the valve and outlet couplings need to abut the water meter, there is little tolerance between those structures which may cause installing or removing the water meter challenging.

An illustrative embodiment of the present disclosure provides a meter box that illustratively includes a first coupling and a second coupling. The first coupling extends from interior to exterior of the meter box. The second coupling extends from the interior to the exterior of the meter box opposite the first coupling. Ends of each of the first coupling and the second coupling form a space therebetween within the meter box configured and sized sufficient to receive a fluid meter. The first coupling includes a coupling body that is in fluid communication between the interior and the exterior of the meter box. The first coupling includes an extension assembly. The extension assembly includes a neck that is in fluid communication with the coupling body. The neck of the extension assembly is linearly movable with respect to the coupling body and configured to selectively create a space between the extension assembly and the fluid meter. The space is sufficient to allow the fluid meter to be installed or removed between the first coupling and the second coupling.

In the above and other embodiments, the meter box may further comprise: the extension assembly includes a collar, a portion of which is spaced apart from the neck with a slot located therebetween, wherein a portion of the coupling body is located within the slot; the extension assembly includes a flange located at an end of the neck and extending transverse to the neck, wherein the flange is sized and configured to abut a corresponding flange on the fluid meter; the extension assembly includes a collar, a portion of which is spaced apart from the neck with a slot located therebetween, wherein a portion of the coupling body is located within the slot, wherein an O-ring is located about an outer surface of the neck, and wherein the O-ring is sandwiched between the outer surface of the neck and an inner surface of the coupling body; the extension assembly includes a collar, a portion of which is spaced apart from the neck with a slot located therebetween, wherein a portion of the coupling body is located within the slot, a snap ring extending from the collar to engage the portion of the coupling body located within the slot to limit movement of the extension assembly a predetermined distance; the portion of the coupling body located within the slot includes a tab that engages the snap ring when the predetermined distance has been reached; an inner surface of the coupling body includes a stop surface that limits movement of the neck; the second coupling includes a coupling body that is in fluid communication between the interior and the exterior of the meter box, wherein the second coupling includes an extension assembly, wherein the extension assembly of the second coupling includes a neck that is in fluid communication with the coupling body of the second coupling, wherein the neck of the second coupling is linearly movable with respect to the coupling body of the second coupling and configured to selectively create a space; the extension assembly of the second coupling includes a collar, a portion of which is spaced apart from the neck with a slot located therebetween, wherein a portion of the coupling body of the second coupling is located within the slot; a slot is located about the outer surface of the neck, and wherein the O-ring is located within that slot and engages the inner surface of the coupling body; the first coupling includes a valve assembly; and the second coupling includes a valve assembly.

An illustrative embodiment of the present disclosure provides a meter box that illustratively includes a first coupling and a second coupling. The first coupling is located adjacent the meter box. The second coupling is located adjacent the meter box. The first coupling includes a coupling body. The first coupling includes an extension assembly. The extension assembly includes a neck that is in fluid communication with the coupling body. The neck of the extension assembly is movable with respect to the coupling body and configured to selectively create a space. The space is sufficient to allow a fluid meter to be installed or removed between the first coupling and the second coupling.

In the above and other embodiments, the meter box may further comprise: the second coupling extends from interior to exterior of the meter box opposite the first coupling; the first coupling extends from interior to exterior of the meter box; ends of each of the first coupling and the second coupling form the space therebetween within the meter box configured and sized sufficient to receive the fluid meter; the extension assembly includes a collar, a portion of which is spaced apart from the neck with a slot located therebetween, and wherein a portion of the coupling body is located within the slot; and the portion of the coupling body located within the slot includes a tab that engages a snap ring when a predetermined distance has been reached.

An illustrative embodiment of the present disclosure provides a meter box that illustratively includes a first coupling. The first coupling is located adjacent the meter box. The first coupling includes a coupling body. The first coupling includes an extension assembly. The extension assembly includes a neck that is in fluid communication with the coupling body. The neck of the extension assembly is movable with respect to the coupling body and configured to selectively create a space. The extension assembly includes a collar, a portion of which is spaced apart from the neck with a slot located therebetween. A portion of the coupling body is located within the slot. The space is sufficient to allow a fluid meter to be installed or removed between the first coupling and the second coupling.

In the above and other embodiments, the meter box may further comprise: a second coupling located adjacent the meter box.

Additional features and advantages of the adjustable meter flange coupling will become apparent to those skilled in the art upon consideration of the following detail description of the illustrated embodiments exemplifying carrying out the adjustable meter flange coupling as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 12 is a cross-sectional view of the expandable coupling assembly;

FIG. 13 is another cross-sectional view of the expandable coupling assembly;

Figure 1:
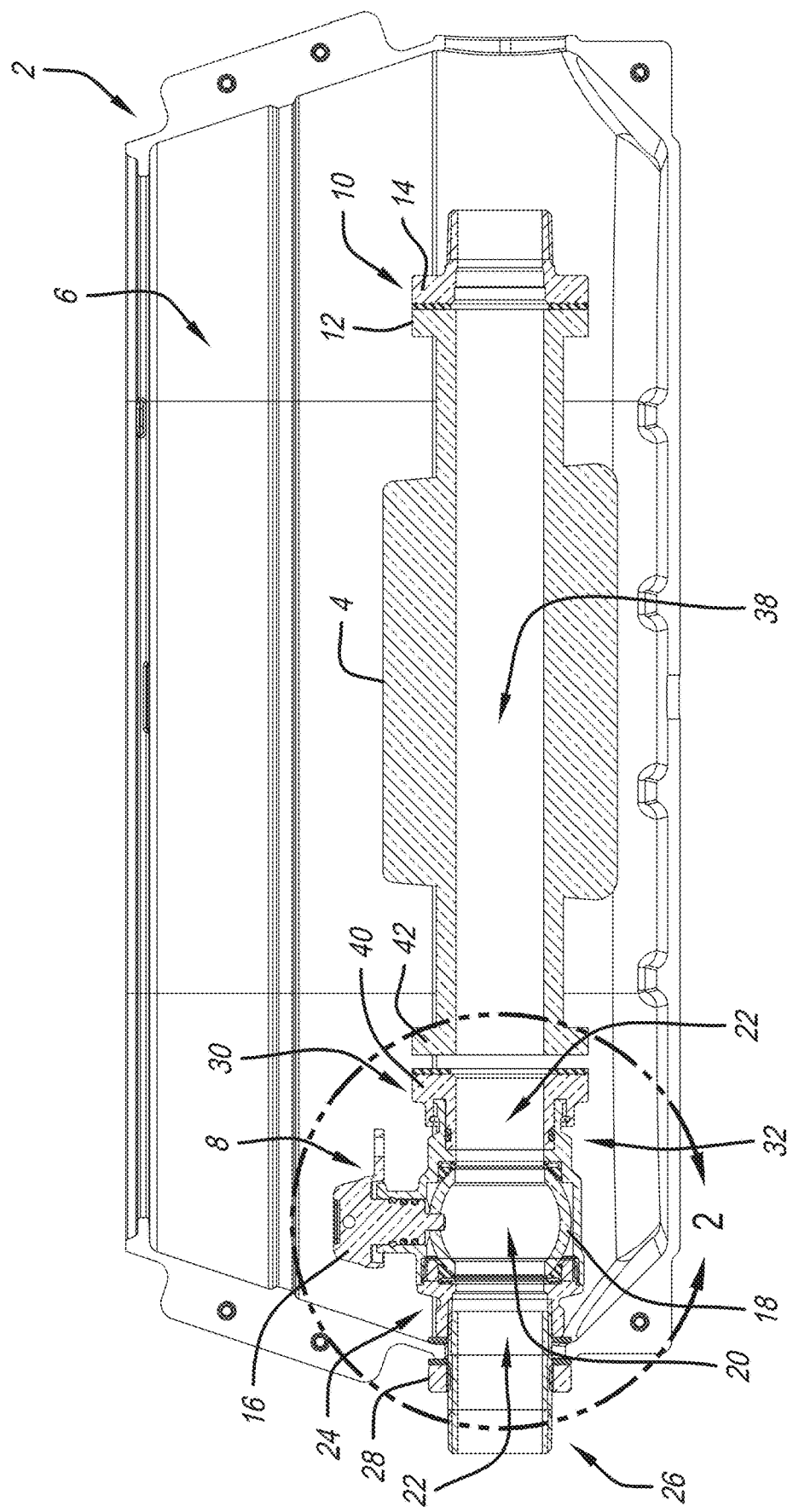
FIG. 1 is a side cross-sectional view of an illustrative meter box.

Additional features and advantages of the adjustable meter flange coupling will become apparent to those skilled in the art upon consideration of the following detailed descriptions of carrying out the adjustable meter flange coupling as presently perceived.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Accordingly, an illustrative embodiment of the present disclosure provides either or both the valve coupling and outlet coupling having an adjustable flange assembly that is movable sufficient to create a tolerance between them and an adjacent water meter for purposes of easing installation or removal of same. In an illustrative embodiment, either valve may include a flange member having a peripheral slot formed between neck and collar portions of the flange member. A flange portion extends from the neck of the flange member and is configured to abut against a corresponding flange portion from a water meter as well as receive fasteners for coupling to the water meter. The peripheral slot receives a cylindrical end portion of the coupling. This cylindrical end portion fits between the neck and collar of the flange member allowing same to move linearly with respect to the coupling. The distance of travel of the flange member toward and away from the coupling is configured to be sufficient to allow a corresponding distance to be created between the coupling and water meter to ease in the installation or removal of same. This distance or tolerance between flanges of the water meter and couplings is contemplated to be just enough space to allow the water meter to be more easily installed or removed between the couplings. Additionally, it is contemplated that, in some embodiments, either the valve coupling or the outlet coupling may include the moving flange assembly. In other embodiments, both the valve and outlet couplings may include the movable flange assembly.

In further embodiments, the peripheral slot in the flange assembly may include a snap ring that is engageable with a corresponding ledge or tab located about the periphery of the cylindrical end portion of the coupling. The snap ring is sized to engage the tab when the flange assembly extends a predetermined distance. That engagement, however, will prevent the flange assembly from being easily removable from the cylindrical end portion of the coupling. Additionally, O-rings or other like seals may be positioned about the flange assembly's neck to prevent any leakage between the cylindrical end portion of the coupling and the movable flange assembly.

The skilled artisan upon reading this disclosure will appreciate that this movable flange assembly may be employed on other couplings, such as straight (with or without valves), angled, meter flange, angled, coupling, check valve, or other like coupling, for example, to create a tolerance between it and another coupled structured.

A side cross-sectional view of an illustrative meter box 2 is shown in FIG. 1. A water meter 4 is placed inside cavity 6 of meter box 2. An expandable straight valve assembly 8 and a flanged coupling 10 are located on opposite sides of water meter 4 within cavity 6 of meter box 2. As shown herein, flange 12, on water meter 4, abuts flange 14 on flanged coupling 10. In an illustrative embodiment, fasteners (not shown) may extend through both flanges 12 and 14 securing same together. For purposes of connecting water meter 4 to flanged coupling 10, it is appreciated that flanged coupling 10 may extend to the exterior of meter box 2, a pipe, or other conduit that may extend through meter box 2 and couple with flanged coupling 10.

With respect to expandable straight valve assembly 8, it may be a ball valve-type assembly that includes a T-head or knob 16 that is attached to a ball 18 having a passageway 20 disposed therethrough. Rotating knob 16 will likewise rotate ball 18 so that passageway 20 is either aligned with passageway 22 of expandable straight valve assembly 8 or blocking same in a closed position. The latter prevents fluid from passing through straight valve assembly 8. It is appreciated that any valve-type mechanism or connector may employ the disclosure herein, not only ball valve connectors.

In the illustrated embodiment one side of expandable straight valve assembly 8 includes a coupling body 24 configured to engage end coupling 26, illustratively, abutting meter box 2, via nut 28. A periphery about a meter box opening of meter box 2 may sandwich between nut 28 and coupling body 24 from expandable straight valve assembly 8 to fluidly connect same with a water source configured to pass through water meter 4 and into a dwelling.

On the other side of expandable straight valve assembly 8, opposite coupling body 24, with knob 16 located there between, is an extension assembly 30. Extension assembly 30 engages and extends from another coupling body 32, located opposite coupling body 24, with the ball-valve assembly composed of knob 16 and ball 18 located there between. Extension assembly 30 is configured to be movable in directions 34 and 36 toward and away from expandable straight valve assembly 8. Passageway 22 extends through extension assembly 30 to allow fluid communication between it and passageway 38 inside water meter 4. Extension assembly 30 includes a flange portion 40 configured to selectively abut flange portion 42 of water meter 4. Illustratively, flange portion 40 is configured to move in directions 34 and 36 to create either a tolerance or an abutment from or against flange portion 42 of water meter 4. Having the ability to move flange portion 40 away from flange portion 42, even just slightly, allows installation and removal of water meter 4 inside meter box 2 easier.

Because there needs to be a watertight seal between expandable straight valve assembly 8 and water meter 4, a snug fit is created between same and expandable straight valve assembly 8, as well as with flanged coupling 10. Such a snug fit can make installing or removing meter boxes more difficult. All of the flanges of the structures in the meter pit abut each other while trying to install or remove water meter 4.

As shown in the illustrative embodiment, moving extension assembly 30 creates a tolerance whereby its flange portion 40 is selectively spaced apart, albeit slightly, from flange portion 42 on water meter 4. This space or tolerance is just enough to allow manipulation of water meter 4 without flange portion 40 interfering. The tolerance provides sufficient space or gap such that water meter 4 may be placed adjacent to it or removed from it.

Figure 2:
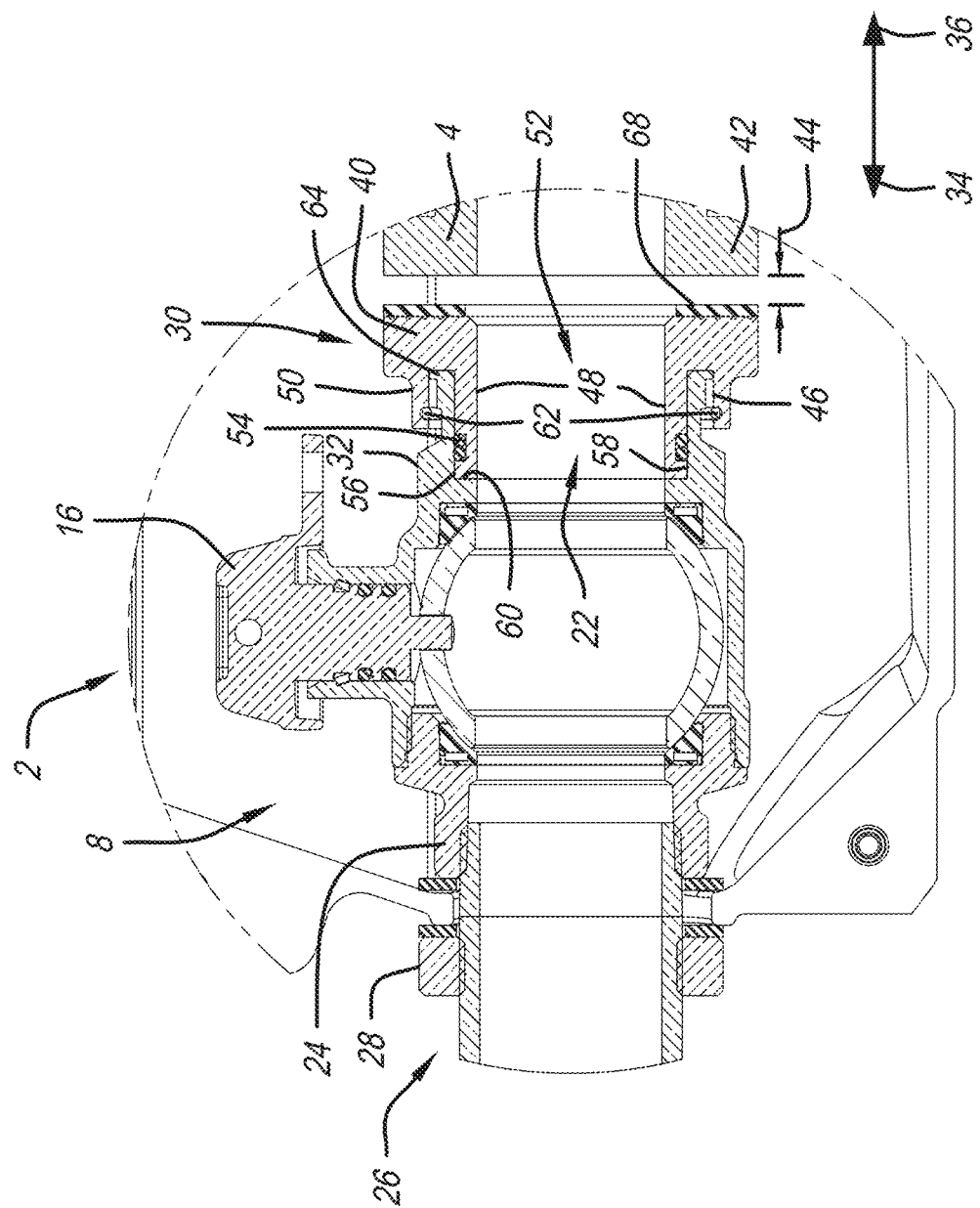
FIG. 2 is a cross-sectional detail view of a straight valve.

A cross-sectional detail view of straight valve assembly 8, from FIG. 1, is shown in FIG. 2. This view better illustrates how extension assembly 30 of expandable straight valve assembly 8 may be movable in directions 34 and 36 to create a selective gap 44 between it and flange portion 42 of water meter 4. In this illustrated view, flange portion 40 of extension assembly 30 is moved in direction 34 creating a gap 44, illustratively, about 0.31 inch from flange portion 42 of water meter 4. As shown, extension assembly 30 includes a slot 46 (see also FIGS. 3, 4, and 5) that receives a portion of coupling body portion 32 of expandable straight valve assembly 8. Slot 46 is bounded by neck 48 and collar 50. It will be appreciated by the skilled artisan upon reading this disclosure that slot 46 between neck 48 and collar 50 is sized sufficient to allow extension assembly 30 to move a distance in directions 34 and 36. Such distance may be as little or as much as the design or application dictates.

Extension assembly 30 also includes a passageway 52 which is generally coincident passageway 22 disposed in expandable straight valve assembly 8. In order to maintain a seal between passageways 22 and 52, since extension assembly 30 is movable, at least one O-ring 54 may be located between the outer side 56 of neck 48 and the inner periphery 58 of coupling body portion 32 at passageway 52. In this way, neck 48 may be movable linearly in directions 34 and 36 with respect to inner periphery 58 without allowing fluid to escape between those structures. It is further appreciated that O-ring 54 may be a plurality of O-rings. Additionally, either one or both of outer side 56 of neck 48 and inner periphery 58 of coupling body portion 32 may include a recess or seat formed therein for receiving one or more O-rings. With this, the O-rings, such as O-ring 54, may be held in place to either of neck 48 or coupling body portion 32 so that O-ring 54 is kept between those structures to prevent any fluid from escaping from between those two structures.

In order to limit movement of extension assembly 30 in direction 34, a stop or abutment 60 is formed as part of the inner periphery 58 of coupling body portion 32. Accordingly, moving extension assembly 30 in direction 34 may continue until neck 48 engages abutment 60. It will be appreciated by the skilled artisan upon reading this disclosure that the size of the abutment can be lessened or increased in order to affect the length of travel of extension assembly 30. Alternatively, coupling body portion 32 may be modified in order to engage other portions of extension assembly 30 in order to limit its length of travel in direction 34.

With respect to restricting length of travel in direction 36, extension assembly 30 may include a snap ring 62 or like structure that extends inwardly from collar 50 and passageway 52. An illustrative tab 64 extends outwardly about the peripheral edge of coupling body portion 32. As extension assembly 30 moves in direction 36, it may continue to do so until snap ring 62 engages tab 64, at which point extension assembly 30 can no longer move in direction 36. It is appreciated that, alternatively, extension assembly 30 may include one or more tabs and coupling body portion 32 include a snap ring positioned to limit travel of extension assembly 30 in direction 36. The objective of abutment 60 and tab 64 on coupling body portion 32 is to define the possible extent of travel allowable by extension assembly 30. Because a length of travel needed is only enough to create a tolerance between otherwise abutting flanges (such as flange portion 40 and flange portion 42) such travel limiting structures and the like may be part of (or attached to) coupling body portion 32 to accomplish such objective. In alternative embodiments, the rings and tabs may be located on opposing structures from that shown herein.

This view also shows coupling body 24 receiving end coupling 26 with nut 28, which attaches expandable straight valve assembly 8 to meter box 2, as well as providing fluid communication from end coupling 26 to a fluid source. The views of both FIGS. 1 and 2 demonstrate how extension assembly 30 is movable in direction 34 to create gap 44 which serves as a tolerance to allow water meter 4 to be either removed from or installed in meter box 2.

Figure 3:
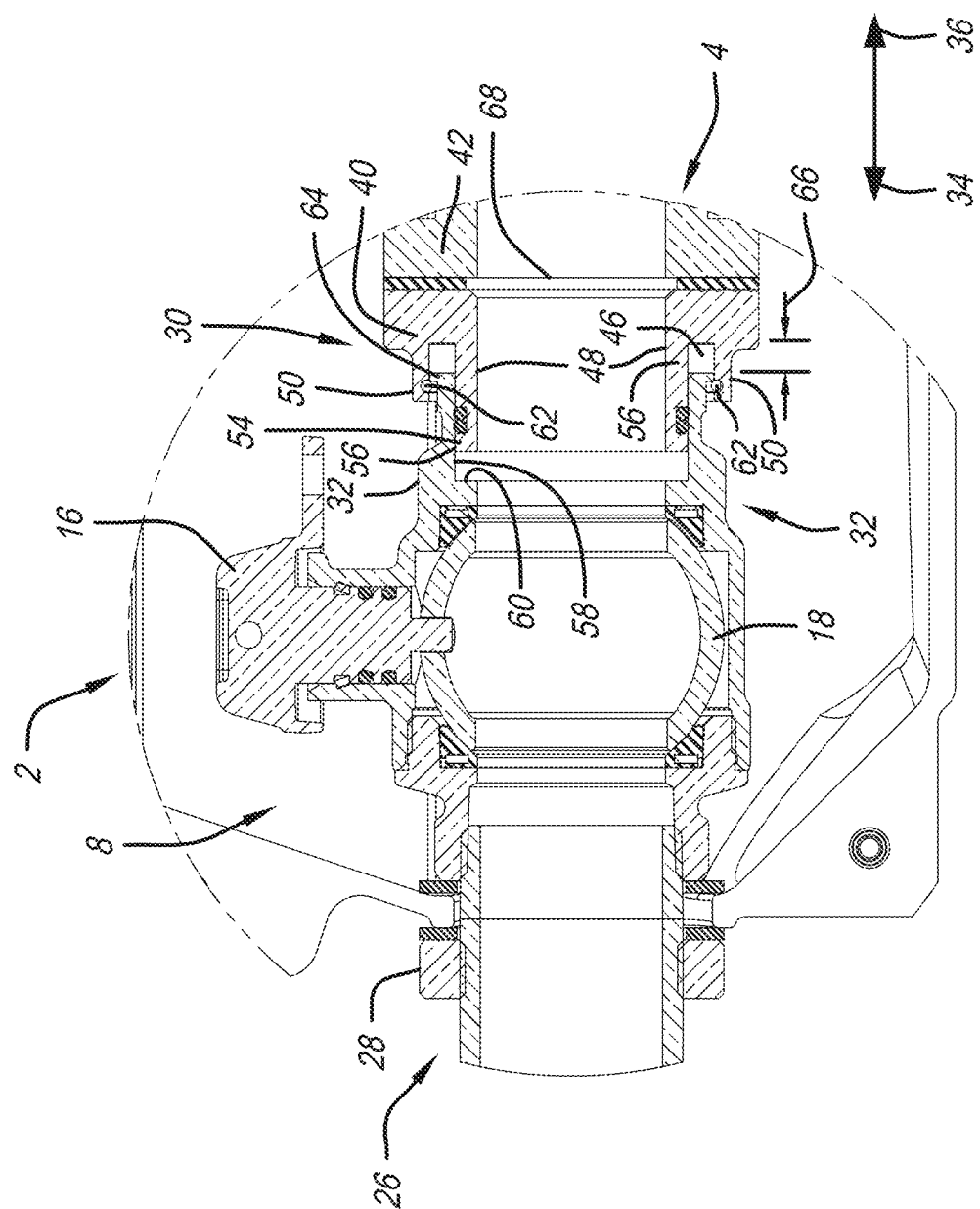
FIG. 3 is another cross-sectional detail view of an expandable straight valve assembly.

Another cross-sectional detail view of expandable straight valve assembly 8. like that shown in FIG. 2, is shown in FIG. 3. This view is similar in that expandable straight valve assembly 8 is coupled to end coupling 26 inside meter box 2. In this view, however, extension assembly 30 is moved in direction 36 so that flange portion 40 engages flange portion 42 of water meter 4. Once water meter 4 is located in its installed position within meter box 2, extension assembly 30 may be moved in direction 36, thereby eliminating tolerance between itself and flange portion 42 so water meter 4 may be attached to expandable straight valve assembly 8. As illustratively shown, extension assembly 30 travels a distance 66 from coupling body portion 32 in order to abut flange portion 40 against flange portion 42. This is accomplished by moving extension assembly 30 along coupling body portion 32, which is fitted within slot 46, a distance limited by snap ring 62. Illustratively, the distance extension assembly 30 may travel in direction 36 is about the same amount as the size of gap 44. As shown in FIG. 2. Illustratively, a distance of travel 66 may be about 0.31 inches, or as little or as much as the design or application dictates. It will be appreciated by the skilled artisan that, despite movement of neck 48 and collar 50 of extension assembly 30, O-ring(s) 54 will maintain a seal between the outer side 56 of neck 48, and the inner periphery 58 of coupling body portion 32. Accordingly, comparing FIG. 2 with FIG. 3, the skilled artisan will understand that sliding extension assembly 30 in directions 34 and 36 causes extension assembly 30 to either abut or be slightly separated from flange portion 42 of water meter 4. It is further appreciated that by doing this, water meter 4 is afforded a slight amount of additional linear space between it and expandable straight valve assembly 8, which may be enough to make installing or removing water meter 4 easier. The additional distance or tolerance (embodied in gap 44) prevents water meter 4 from having such a tight fit between expandable straight valve assembly 8 and flanged coupling 10.

Figure 4:
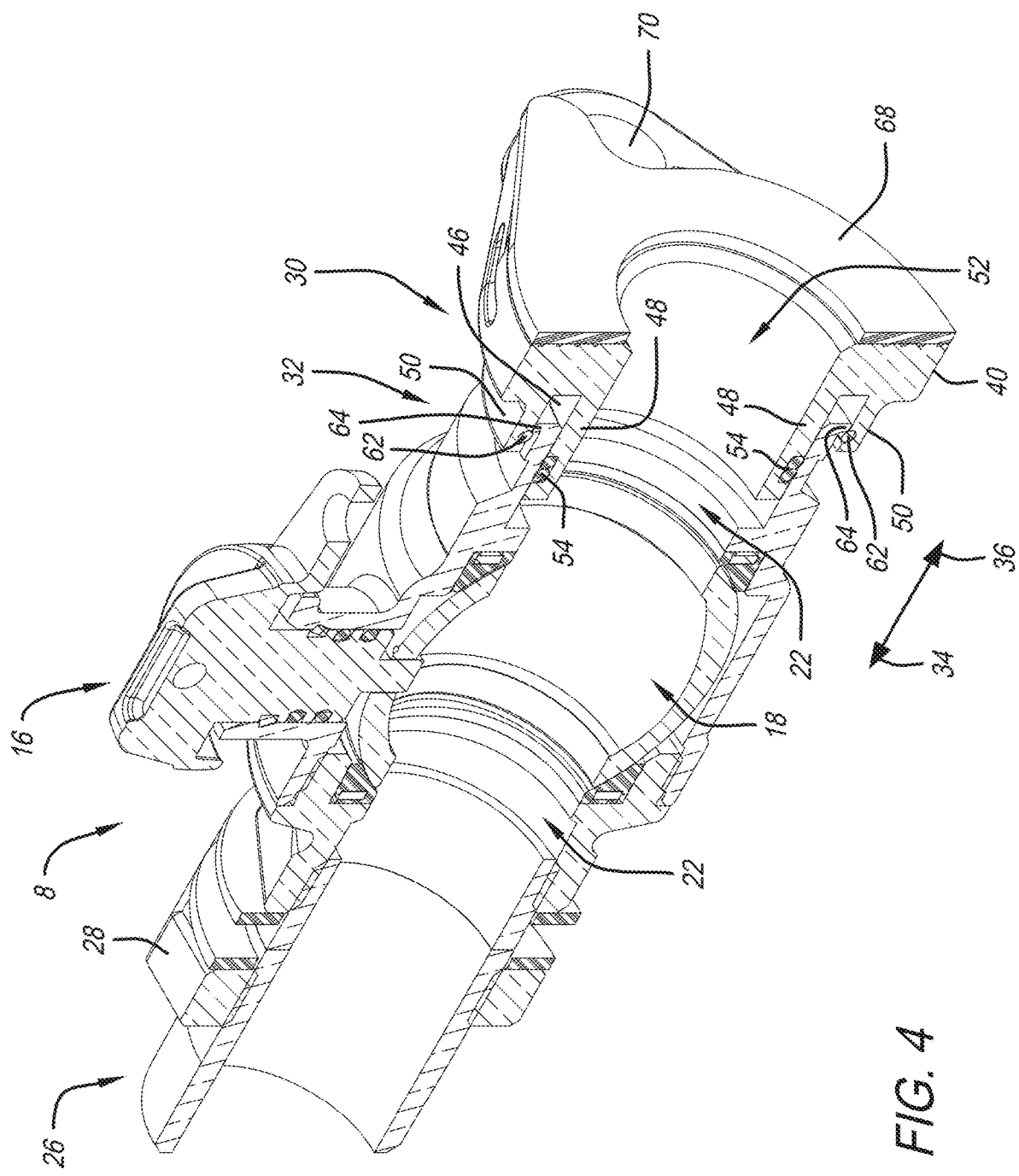
FIG. 4 is a perspective cross-sectional view of the expandable straight valve assembly.

A perspective cross-sectional view of expandable straight valve assembly 8 is shown in FIG. 4. As depicted here, extension assembly 30 is extended from coupling body portion 32. In this configuration, with extension assembly 30 extended, flange portion 40 will be able to mate with flange portion 42 of water meter 4 when needed (see, also, FIG. 1). A seal or gasket 68 may be attached to flange portion 40 as shown. Gasket 68 may be pressed against flange portion 42 of water meter 4 in order to create a seal between it and expandable straight valve assembly 8 as also shown in FIG. 3.

Also shown in FIG. 4 is illustrative bolt hole 70 disposed through flange portion 40 for purposes of receiving a bolt or other fastener that may likewise extend through flange portion 42 of water meter 4. The fasteners will secure the flange portions together, thereby creating a sealed fluid communication between passageway 22 of expandable straight valve assembly 8 and passageway 38 of water meter 4. It is appreciated that by fastening flange portions 40 and 42 together, gasket 68 may be compressed therebetween in order to provide a sufficient seal between flange portions 40 and 42 so no leaking will occur.

Further, shown in FIG. 4 is expandable straight valve assembly 8 with neck 48, and collar 50 of extension assembly 30 forming slot 46 there between. The skilled artisan upon reading this disclosure will appreciate that neck 48, collar 50, and slot 46 all illustratively encircle coupling body portion 32 about passageways 22 and 52. This view further demonstrates how tab 64 of coupling body portion 32 fits within slot 46 of extension assembly 30. Slot 46 forms the structural pathway that allows extension assembly 30 to move in direction 36 a limited extent. Snap ring 62 also encircles at least a portion of the inside of collar 50 to engage tab 64 at the end of travel of extension assembly 30 in direction 36.

The at least one O-ring 54 may be located between the outer side 56 of neck 48 and the inner periphery 58 of coupling body portion 32 at passageway 52. Again, neck 48 may be movable linearly in directions 34 and 36 with respect to inner periphery 58 without allowing fluid to escape between those structures. This view of expandable straight valve assembly 8 also includes knob 16 that moves ball 18. Additionally, end coupling 26 with nut 28 located thereon is configured to be fitted on meter box 2 (see, also, FIG. 1).

Figure 5:
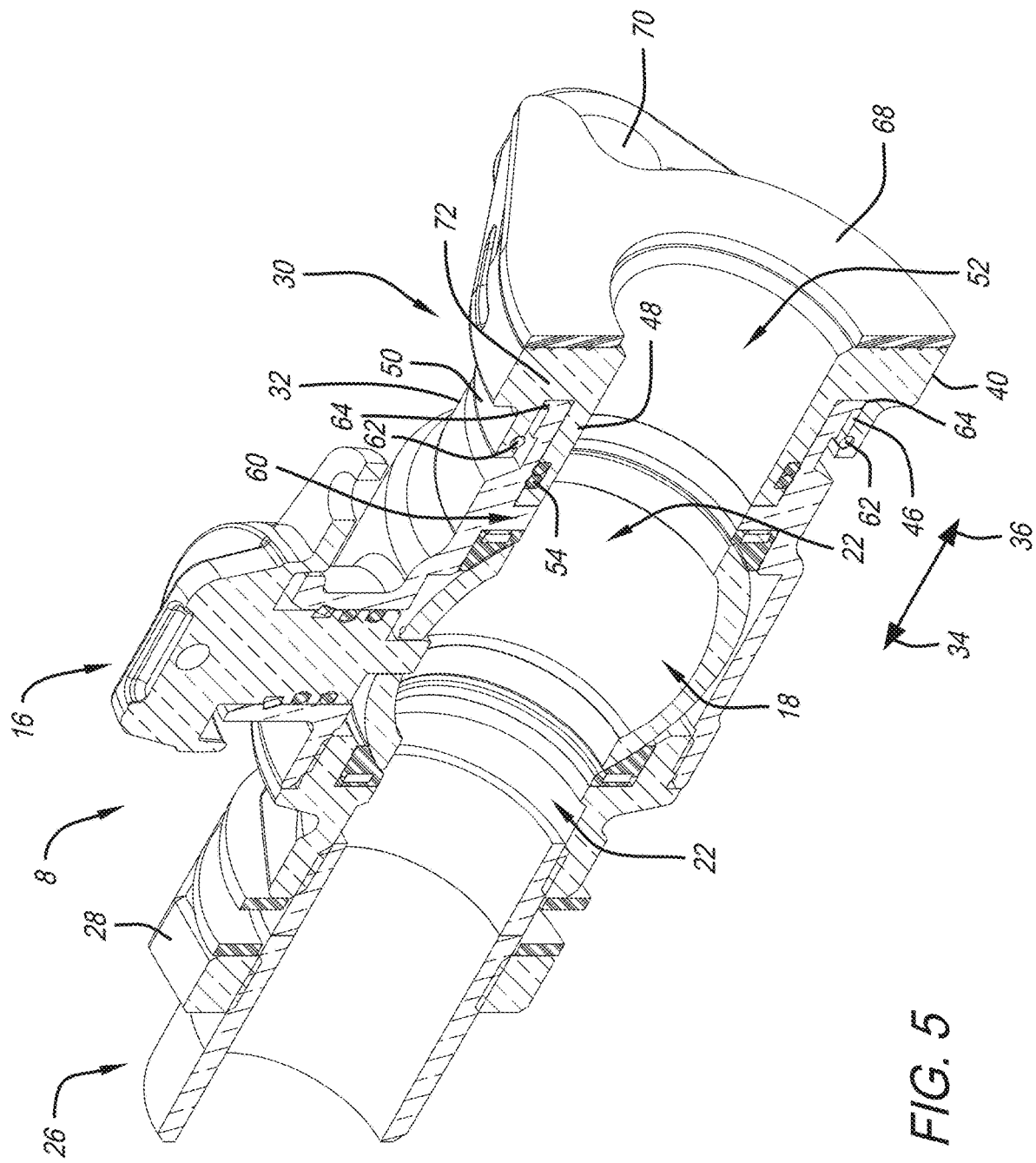
FIG. 5 is another perspective cross-sectional view of the expandable straight valve assembly.

Another perspective cross-sectional view of expandable straight valve assembly 8 is shown in FIG. 5. This view is in contrast to the view of expandable straight valve assembly 8 shown in FIG. 4 in that now extension assembly 30 is retracted in direction 34 so flange portion 40 separates from flange portion 42 of water meter 4 (see, also, FIGS. 1 and 2). To that end, gasket 68, illustratively located on flange portion 40, is separated as well. When extension assembly 30 moves in direction 34, coupling body portion 32 is further fitted into slot 46 between neck 48 and collar 50, which all encircle all or a portion of expandable straight valve assembly 8. As illustratively shown, tab 64 abuts end 72 of slot 46. Similarly, or alternatively, depending on the construction of coupling body portion 32 and extension assembly 30, neck 48 may abut or stop at abutment 60, illustratively, integrally formed, or attached to an inner portion of coupling body portion 32 adjacent passageway 22 inside expandable straight valve assembly 8. It will be appreciated by the skilled artisan upon reading this disclosure that such abutments, stops, etc., that can limit the length of travel of extension assembly 30 in direction 34, aside from neck 48 engaging abutment 60. For example, end 72 of slot 46 may engage coupling body portion 32, and/or collar 50 engaging a stop structure on coupling body portion 32, either attached to or integrally formed thereon. As shown illustratively herein, O-ring(s) 54 maintain contact between coupling body portion 32 and neck 48 maintaining a seal there between. Contrasting the view of expandable straight valve assembly 8, with extension assembly 30 extended in direction 36 shown in FIG. 4, with extension assembly 30 retracted in direction 34 shown in FIG. 5, it is clear that O-ring(s) 54 maintain the seal between neck 48 and coupling body portion 32 throughout that course of travel.

Figure 6:
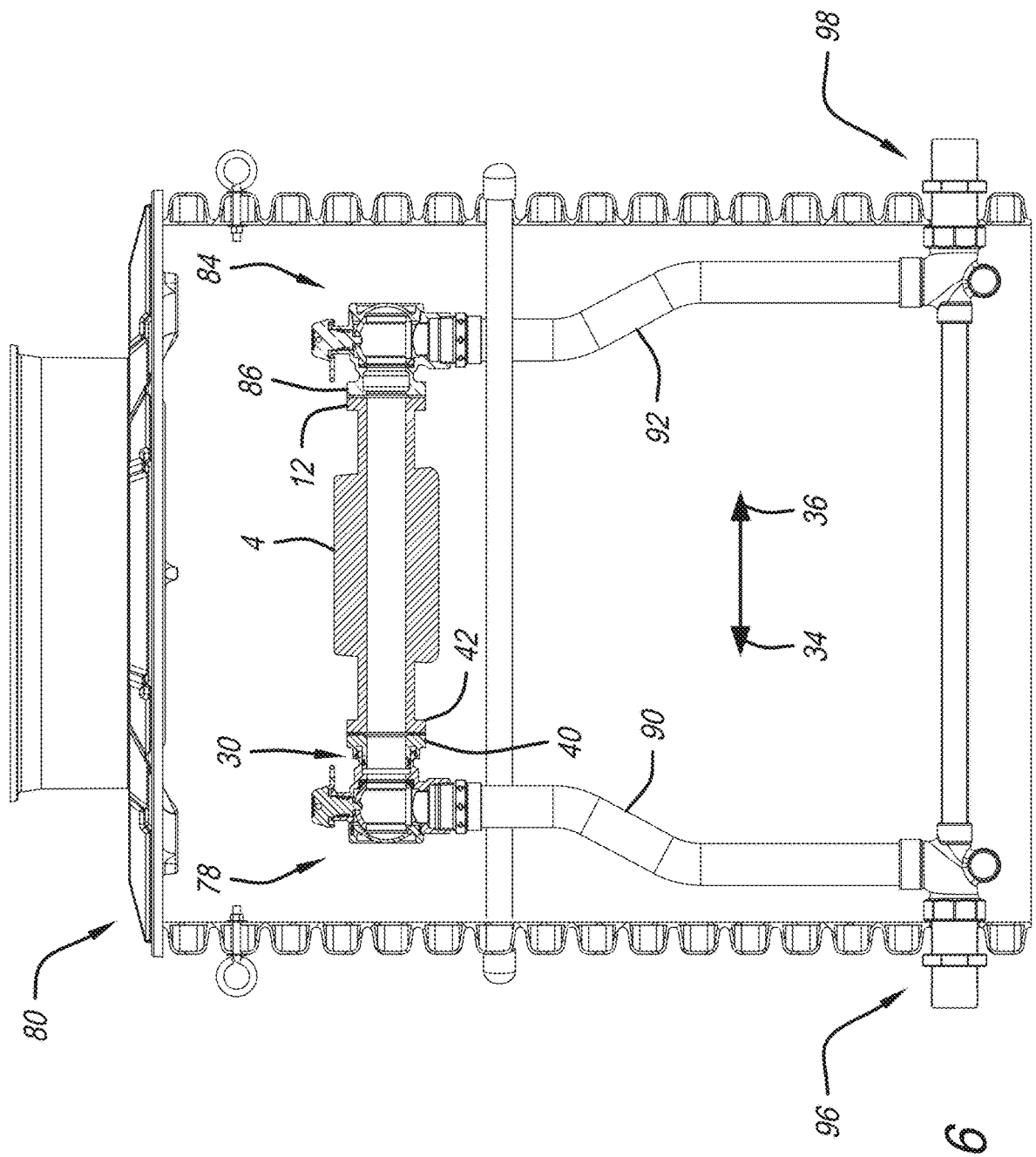
FIG. 6 is a cross-sectional view of an expandable angle valve assembly fitted onto water meter inside a meter pit.
Figure 7:
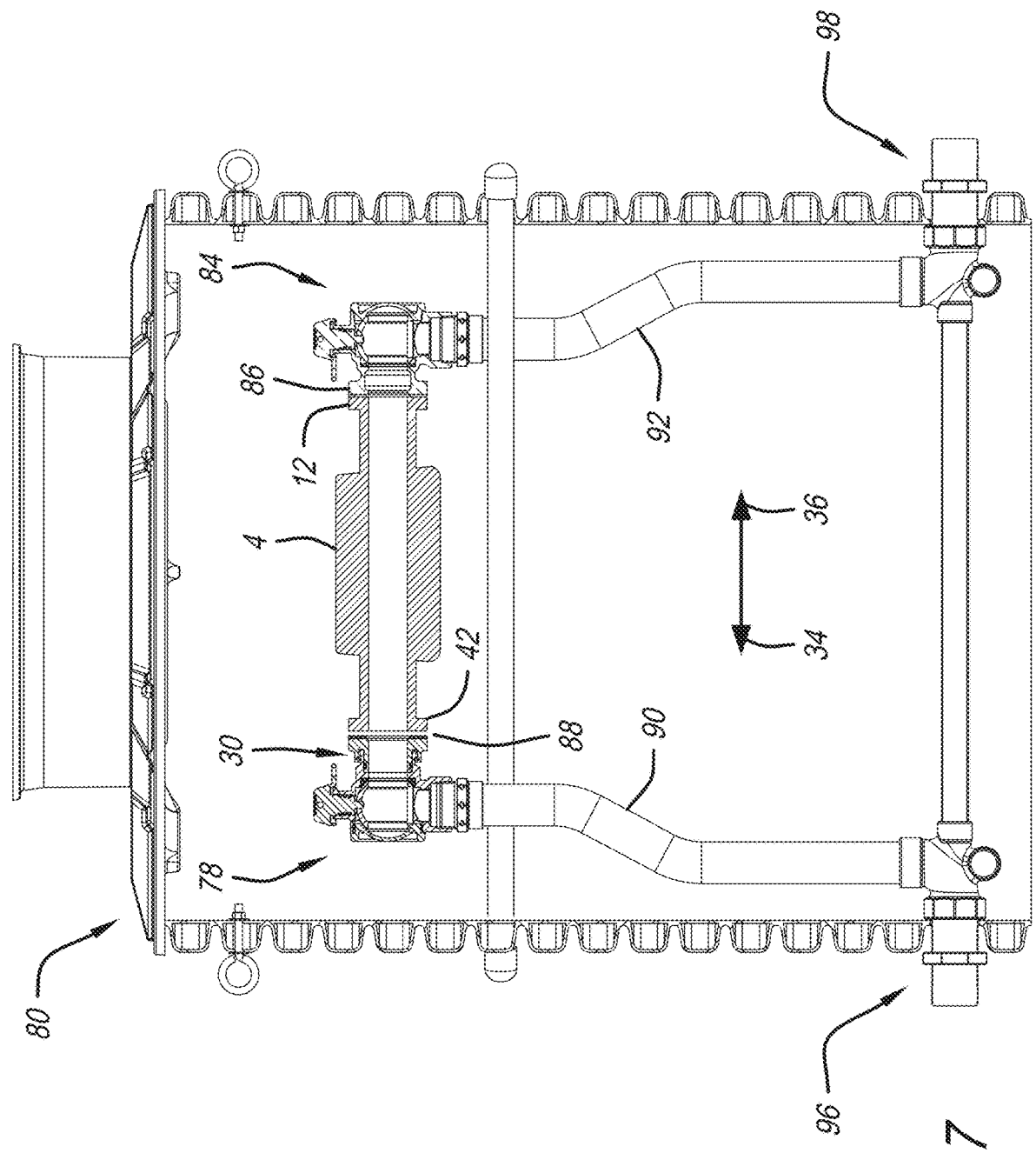
FIG. 7 is another a cross-sectional view of an expandable angle valve assembly fitted onto water meter inside a meter pit.

Cross-sectional views of an expandable angle valve assembly 78 fitted onto water meter 4 inside a meter pit 80 is shown in FIGS. 6 and 7. These views demonstrate expandable angle valve assembly 78 including extension assembly 30, movable in directions 34 and 36, similar to that described with respect to expandable straight valve assembly 8 of FIGS. 1 through 5. The views in FIGS. 6 and 7 further demonstrate the utility of the present disclosure. The view in FIG. 6, for example, shows water meter 4 installed with its flange portion 42 engaged abutting flange portion 40 of extension assembly 30, as well as flange portion 12 abutting a flange portion 86 of angle valve assembly 84. This is essentially the installed position of the valves and water meter 4 during their operation while inside meter pit 80. It is appreciated that angle valve assembly 84 can be the check valve or a ball valve, with or without an expandable flange assembly like extension assembly 30, or may be any other type of valve or conduit of the type that can connect to water meter 4 with or without an expandable flange assembly. Regardless, as shown in FIG. 6, water meter 4 is coupled to both expandable angle valve assembly 78 and angle valve assembly 84 allowing water to flow through both valves and the meter in normal operation.

When it is desired that water meter 4 be removed from meter pit 80, for example, as shown in FIG. 7, extension assembly 30 can be moved in direction 34 to create gap 88. Like gap 44 from FIG. 2, gap 88 creates sufficient space or tolerance between expandable angle valve assembly 78 and water meter 4 so it can be more easily removed from between expandable angle valve assembly 78 and angle valve assembly 84. Such ease in removal can be a substantive benefit to an installer. Conversely, gap 88 allows enough space for water meter 4 to fit between expandable angle valve assembly 78 and angle valve assembly 84 to make the installation process for water meter 4 easier as well. It is appreciated as shown in both FIGS. 6 and 7 that expandable angle valve assembly 78 and angle valve assembly 84 may be connected to conduits 90 and 92 oriented transverse from the flow path through water meter 4 and connect to inlet 96 and outlet 98, respectively, inside meter pit 80.

Figure 8:
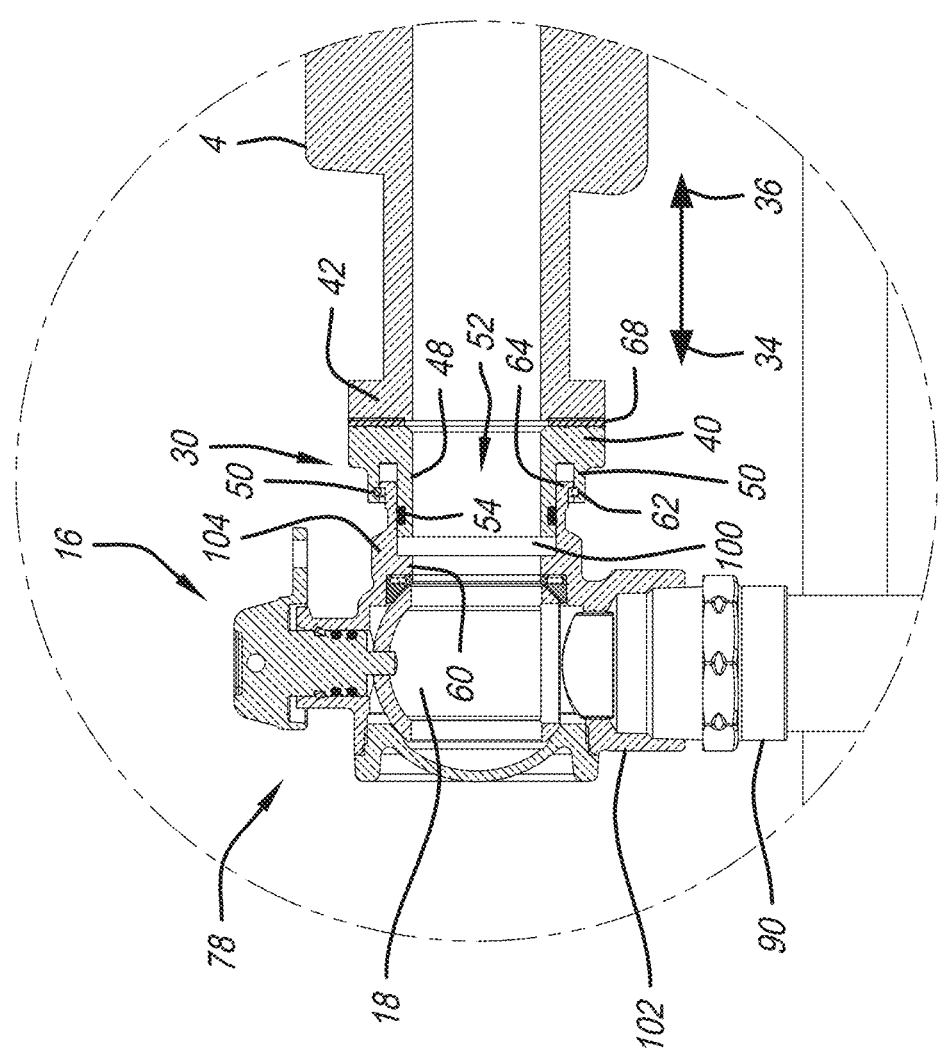
FIG. 8 is a cross-sectional detail view of the expandable angle valve assembly.
Figure 9:
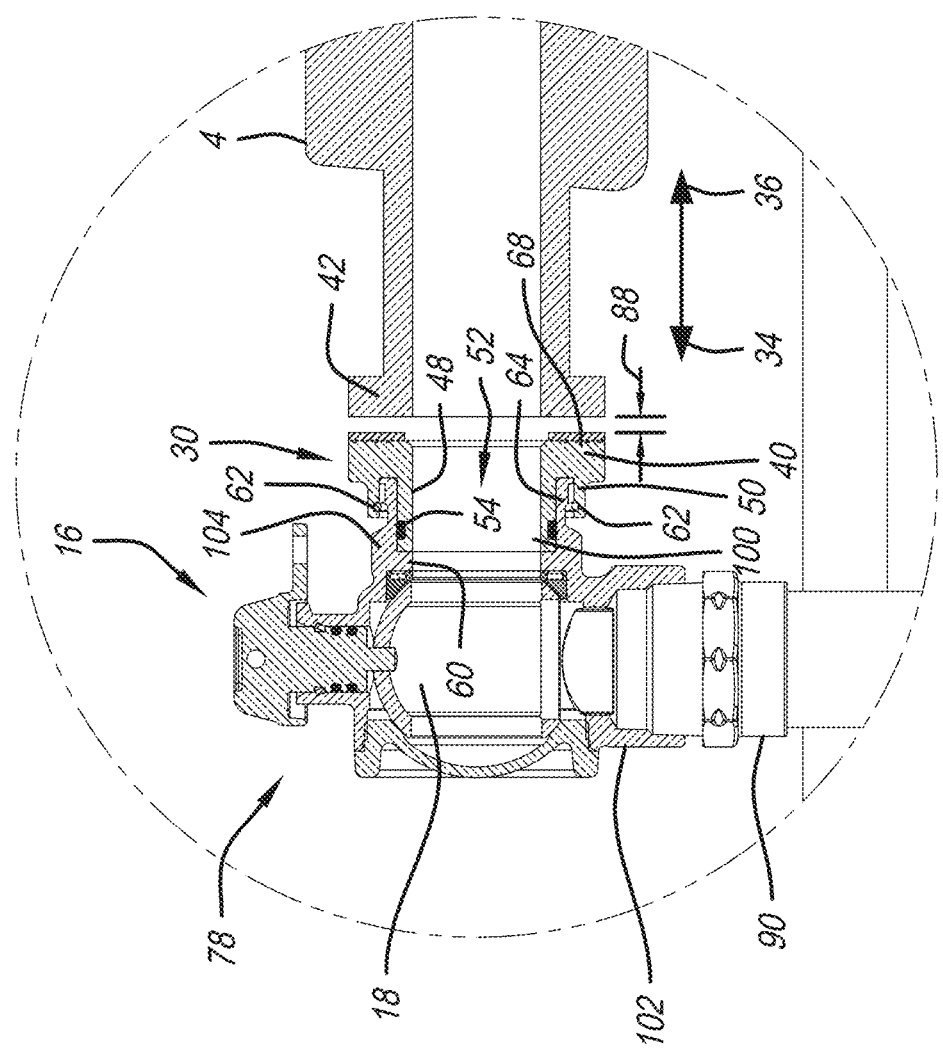
FIG. 9 is another cross-sectional detail view of the expandable angle valve assembly.

Cross-sectional detail views of expandable angle valve assembly 78 is shown in both FIGS. 8 and 9. As depicted, expandable angle valve assembly 78 illustratively includes a knob 16, similar to expandable straight valve assembly 8, which is attached to ball 18, to allow or restrict fluid flow through passageway 100 from conduit 90 which is coupled to expandable angle valve assembly 78, via connection 102. It is appreciated that extension assembly 30 may be coupled to body 104 of expandable angle valve assembly 78 and movable in directions 34 and 36. Extension assembly 30 coupled to expandable angle valve assembly 78 is similar to that shown coupled to expandable straight valve assembly 8, including neck 48 and collar 50 forming slot 46 located there between for receiving a portion of body 104. It is appreciated that passageway 52 through extension assembly 30 is at fluid communication with passageway 100 to allow fluid to flow from expandable angle valve assembly 78 and into water meter 4. Expandable angle valve assembly 78 includes similar features such as stop or abutment 60 and tab 64 to limit movement of extension assembly 30 in directions 34 and 36. Additionally, the same or similar O-ring 54 or plurality of O-rings 54 fitted onto neck 48, as well as snap ring 62 fitted about collar 50, may be used to seal and limit movement, respectively, of extension assembly 30 the same or similar to that described with respect to expandable straight valve assembly 8. A gasket 68 is also illustratively attached to flange portion 40 of extension assembly 30.

A distinction between the view of expandable angle valve assembly 78 shown in FIG. 8 from that shown in FIG. 9 is that the latter includes gap 88 located between flange portion 40 of extension assembly 30 and flange portion 42 of water meter 4 when extension assembly 30 is moved in direction 34. It is appreciated in FIG. 9 how such gap 88 can make installation or removal of water meter 4 easier with the space or tolerance existing between expandable angle valve assembly 78 and water meter 4. As discussed with respect to expandable straight valve assembly 8, once water meter 4 is in its desired position like that shown in FIGS. 6 and 7, extension assembly 30 may be moved in direction 36 so flange portion 40 engages flange portion 42 for coupling expandable angle valve assembly 78 to water meter 4.

Another illustrative embodiment of the present disclosure includes an expandable coupling assembly 106 shown in FIGS. 10, 11, 12, and 13. Expandable coupling assembly 106 may include an extension assembly 30 similar to that described with respect to expandable straight valve assembly 8 and expandable angle valve assembly 78.

Figure 10:
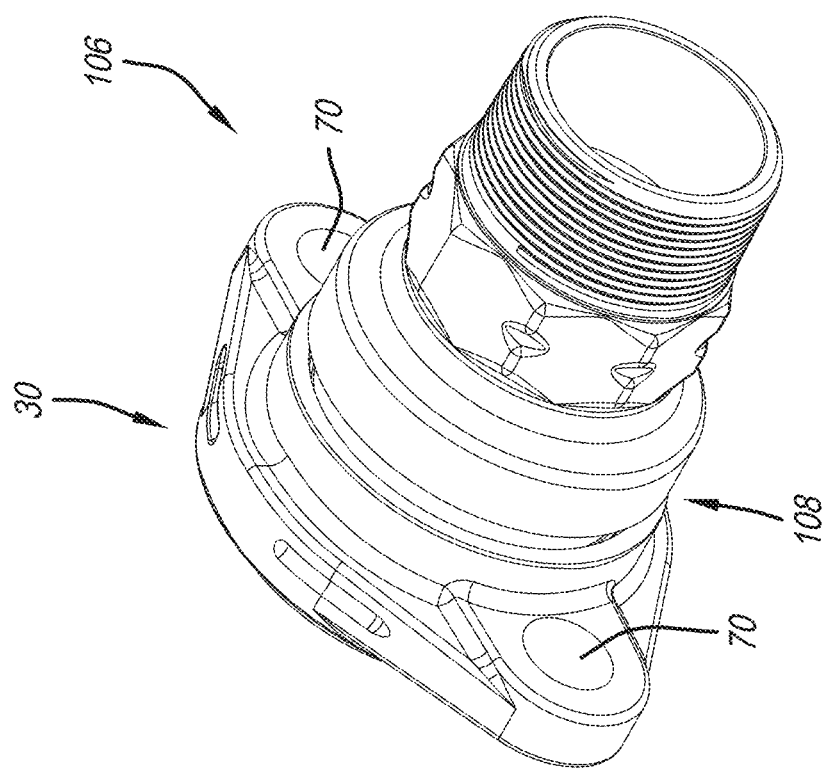
FIG. 10 is a perspective views of the expandable coupling assembly.
Figure 11:
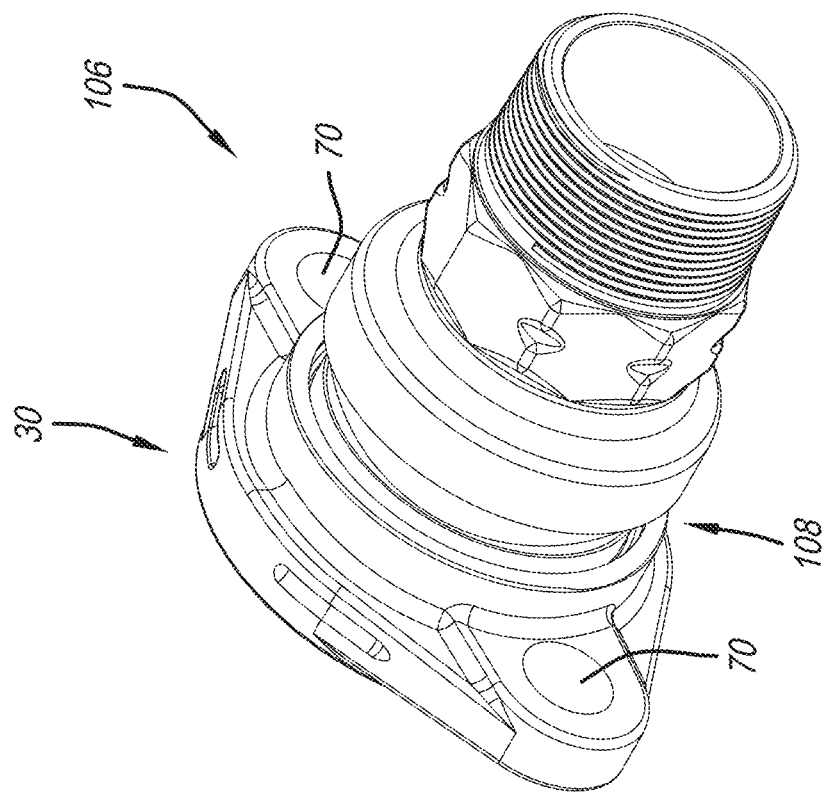
FIG. 11 is another perspective view of the expandable coupling assembly.

The perspective views of expandable coupling assembly 106 are shown in FIGS. 10 and 11. The view shown in FIG. 10, depicts extension assembly 30 extended from body 108 of expandable coupling assembly. 106 (see, also, FIG. 12). In contrast, the perspective view of expandable coupling assembly 106 shown in FIG. 11 depicts extension assembly 30 retracted or collapsed onto body 108 (see, also, FIG. 13). It will be appreciated by the skilled artisan upon reading this disclosure that expandable coupling assembly 106 may be employed along with or in alternative to expandable straight valve assembly 8 shown in FIG. 1. Here, expandable coupling assembly 106 may replace flange coupling 10 shown therein. Bolt holes 70 are shown disposed through flange portion 40 to secure extension assembly 30 to flange portion 42 of water meter 4.

Cross-sectional views of expandable coupling assembly 106 are shown in FIGS. 12 and 13. These views demonstrate how extension assembly 30 with neck 48 and collar 50 forming slot 46 there between is fitted about body 108, which is received in slot 46 so that extension assembly 30 is movable in directions 36 and 34. Like the other embodiments, extension assembly 30 is coupled to expandable coupling assembly 106 and includes snap ring 62, which engages tab 64 on collar 50. O-ring(s) 54, located on neck 48, create a seal between themselves and body 108 fitted in slot 46. As distinguished between views of expandable coupling assembly 106 shown in FIGS. 12 and 13, is that in FIG. 12, extension assembly 30 is extended in direction 36 from body 108 of expandable coupling assembly 106, which creates an extended distance 110, similar to distance 66 previously discussed from stop or abutment 60 formed on expandable straight valve assembly 8. It is further appreciated that passageway 112 may be coextensive in the fluid communication with passageway 52 of extension assembly 30.

Figure 15:
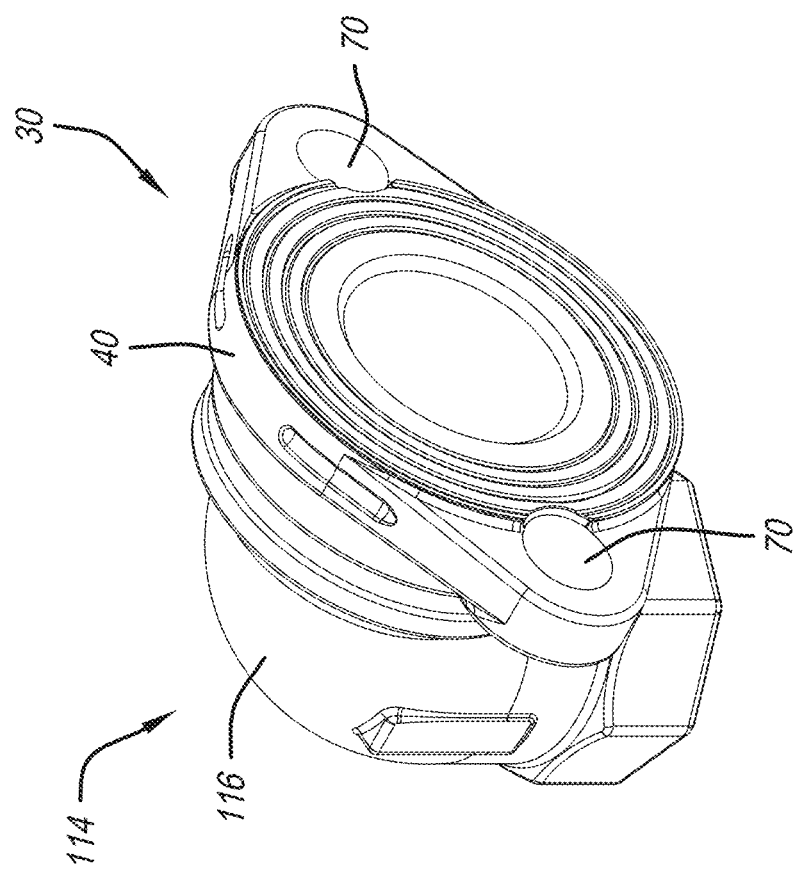
FIG. 15 is another perspective view of the flange assembly coupled to an expandable angle coupling assembly.
Figure 14:
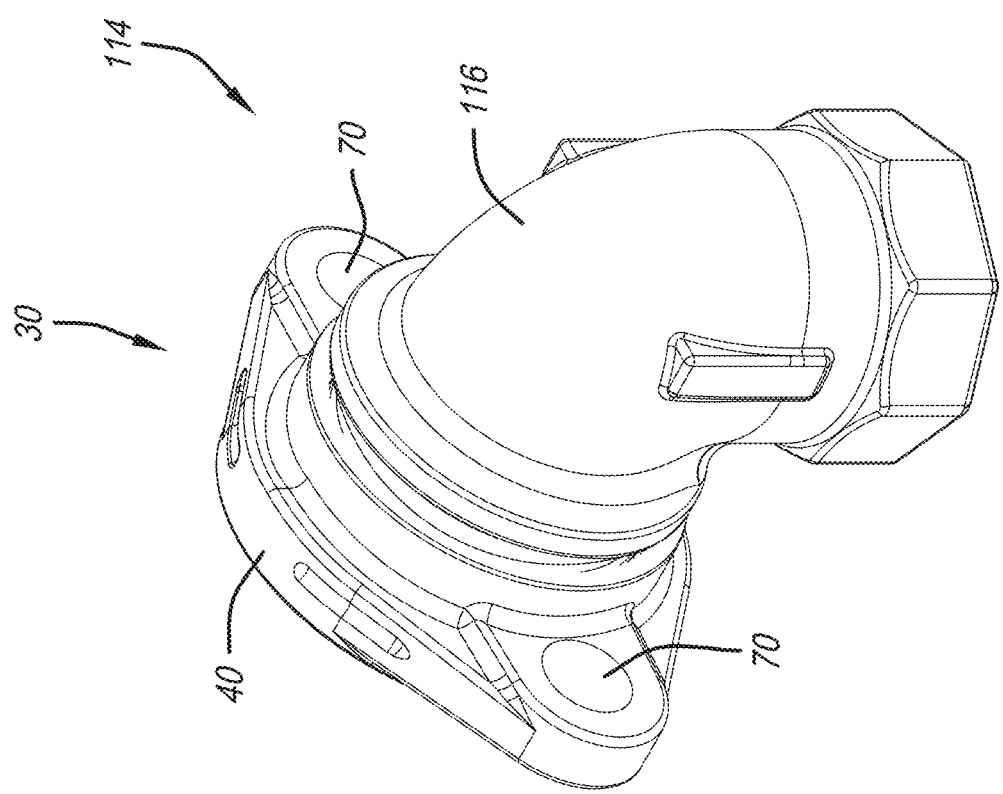
FIG. 14 is a perspective view of a flange assembly coupled to an expandable angle coupling assembly.

Perspective, front, and cross-sectional views of collapsed and expanded extension assembly 30, coupled to an expandable angle coupling assembly 114 are shown in FIGS. 14, 15, 16, 17, 18, and 19. Rear and front perspective views of expandable angle coupling assembly 114 are shown in FIGS. 14 and 15. In these views, extension assembly 30 is shown coupled to body 116 of expandable angle coupling assembly 114. Bolt holes 70 are shown illustratively disposed through flange portion 40 of extension assembly 30. It is appreciated that extension assembly 30 may collapse or expand to or from body 116 similar to the prior embodiments disclosed herein. Furthermore, expandable angle coupling assembly 114 may be employed in place of angle valve assembly 84 shown in FIGS. 6 and 7. Also, expandable angle coupling valve assembly 114 may be used in addition to or instead of expandable angle valve assembly 78 shown in FIGS. 6, 7, 8, and 9, depending on the needs of the installer to have gaps created on both sides of water meter 4 or only on one side or the other.

Figure 16:
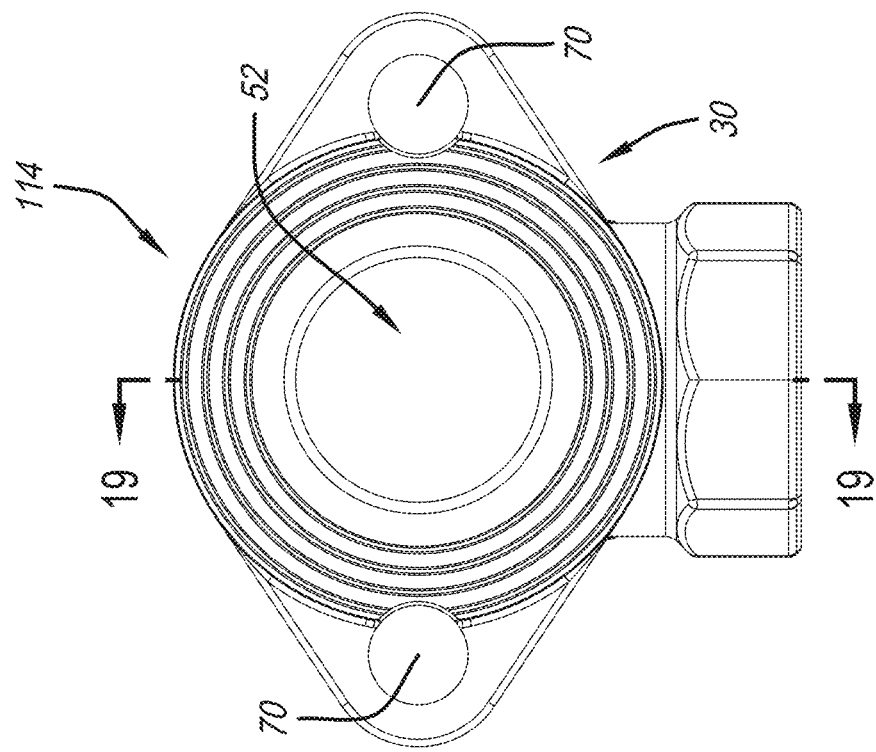
FIG. 16 is a front view of a flange assembly coupled to an expandable angle coupling assembly.
Figure 17:
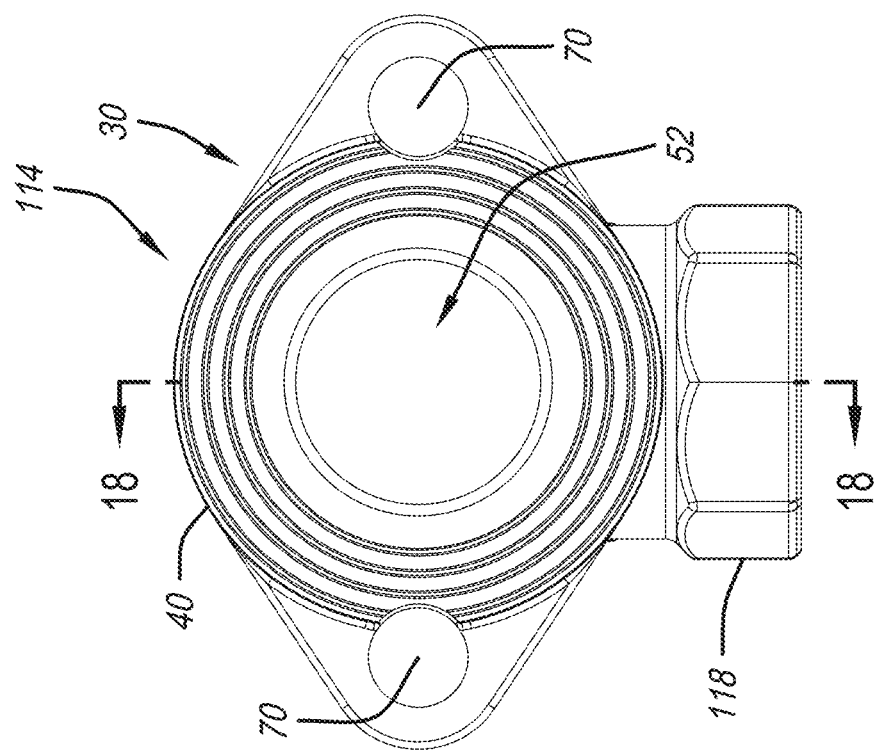
FIG. 17 is another front view of a flange assembly coupled to an expandable angle coupling assembly.

The front views of expandable angle coupling assembly 114 are shown in FIGS. 16 and 17. These views depict extension assembly 30 with bolt holes 70 disposed through flange portion 40. Passageway 52 is disposed through extension assembly 30 and is illustratively oriented transverse to coupling 118, which is similar to connection 102 on expandable angle valve assembly 78 shown in FIGS. 8 and 9.

Figure 19:
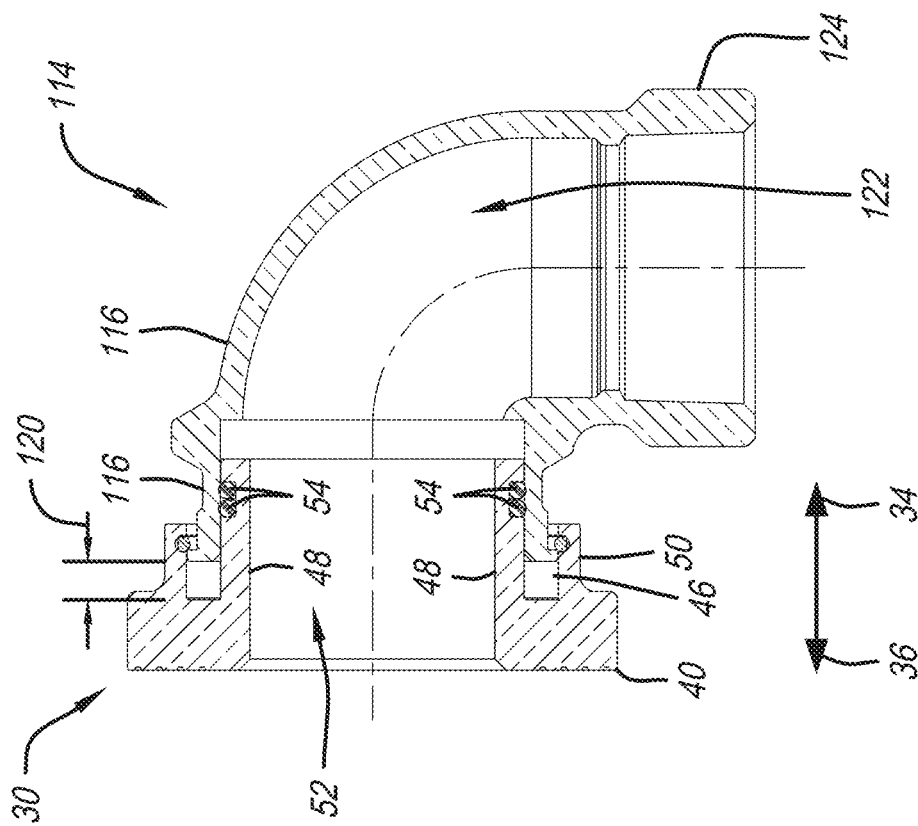
FIG. 19 is another cross-sectional view of a flange assembly coupled to an expandable angle coupling assembly.
Figure 18:
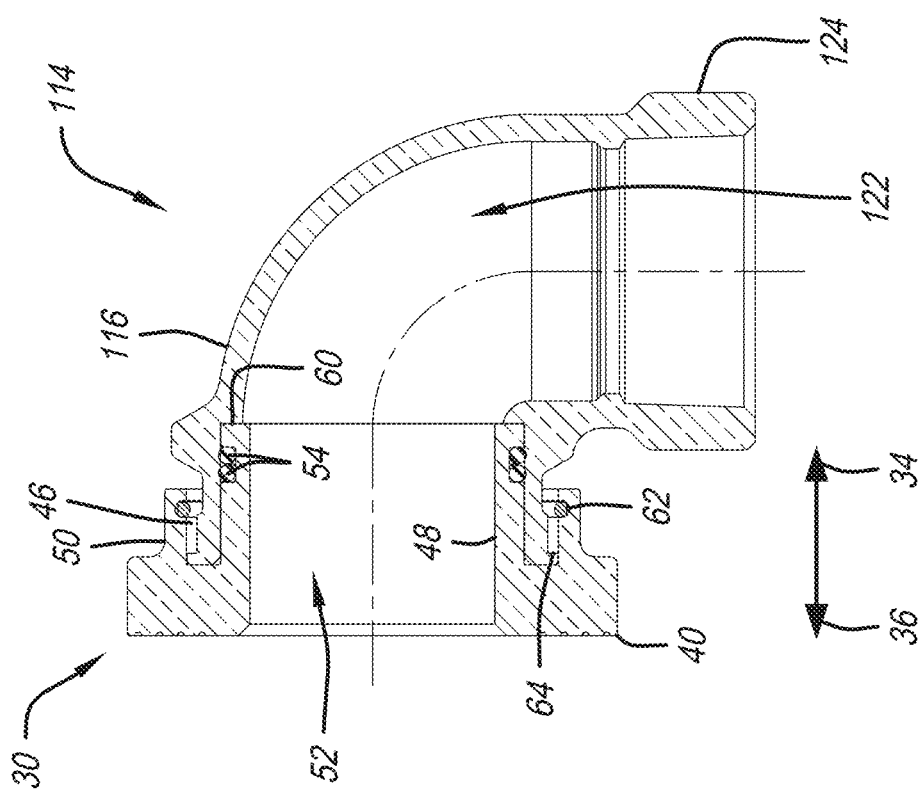
FIG. 18 is a cross-sectional view of a flange assembly coupled to an expandable angle coupling assembly.

Perspective views of expandable angle coupling assembly 114 are shown in FIGS. 18 and 19. A distinction between the views in FIGS. 18 and 19 is that extension assembly 30 of expandable angle coupling assembly 114 shown in FIG. 18 is in a collapsed position (i.e., moved in direction 34) while extension assembly 30 is shown extended from body 116 (i.e., moved in direction 36) in FIG. 19. It is appreciated that extension assembly 30, with neck 48, collar 50, and slot 46 located there between, is movable along body 116 between collapsed and expanded positions. Snap ring 62, on collar 50, engages tab 64 on body 116 to limit movement of extension assembly 30 in direction 36. Conversely, stop or abutment 60 on body 116 limits movement of extension assembly 30 in direction 34. With extension assembly 30 extended in direction 36, a distance 120 is created from body 116 similar to distance 110 with respect to expandable coupling assembly 106 and distance 66 with respect to expandable straight valve assembly 8 previously shown and discussed. Also shown herein is passageway 52 of extension assembly 30 being in fluid communication with passageway 122 of expandable angle coupling assembly 114 to allow fluid to pass from coupling 124 through passageway 52 and out of extension assembly 30. O-ring(s) 54 on neck 48 of extension assembly 30 prevent fluid from escaping between body 116 of expandable angle coupling assembly 114 and neck 48 of extension assembly 30 except for through passageways 52 and 122.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application the disclosure from this non-provisional patent application controls.

What is claimed:

1. A meter box comprising:
   a first coupling;
   wherein the first coupling extends from interior to exterior of the meter box; and
   a second coupling;
   wherein the second coupling extends from the interior to the exterior of the meter box opposite the first coupling;
   wherein ends of each of the first coupling and the second coupling form a space there between within the meter box configured and sized sufficient to receive a fluid meter;
   wherein the first coupling includes a coupling body that is in fluid communication between the interior and the exterior of the meter box;
   wherein the first coupling includes an extension assembly;
   wherein the extension assembly includes a neck that is in fluid communication with the coupling body;
   wherein the neck of the extension assembly is linearly movable with respect to the coupling body and configured to selectively create a space between the extension assembly and the fluid meter; and
   wherein the space is sufficient to allow the fluid meter to be installed or removed between the first coupling and the second coupling.

2. The meter box of claim 1, wherein the extension assembly includes a collar, a portion of which is spaced apart from the neck with a slot located therebetween, wherein a portion of the coupling body is located within the slot.

3. The meter box of claim 1, wherein the extension assembly includes a flange located at an end of the neck and extending transverse to the neck, wherein the flange is sized and configured to abut a corresponding flange on the fluid meter.

4. The meter box of claim 1, wherein the extension assembly includes a collar, a portion of which is spaced apart from the neck with a slot located therebetween, wherein a portion of the coupling body is located within the slot, wherein an O-ring is located about an outer surface of the neck, and wherein the O-ring is sandwiched between the outer surface of the neck and an inner surface of the coupling body.

5. The meter box of claim 1, wherein the extension assembly includes a collar, a portion of which is spaced apart from the neck with a slot located therebetween, wherein a portion of the coupling body is located within the slot, a snap ring extending from the collar to engage the portion of the coupling body located within the slot to limit movement of the extension assembly a predetermined distance.

6. The meter box of claim 5, wherein the portion of the coupling body located within the slot includes a tab that engages the snap ring when the predetermined distance has been reached.

7. The meter box of claim 1, wherein an inner surface of the coupling body includes a stop surface that limits movement of the neck.

8. The meter box of claim 1, wherein the second coupling includes a coupling body that is in fluid communication between the interior and the exterior of the meter box, wherein the second coupling includes an extension assembly, wherein the extension assembly of the second coupling includes a neck that is in fluid communication with the coupling body of the second coupling, wherein the neck of the second coupling is linearly movable with respect to the coupling body of the second coupling and configured to selectively create a space.

9. The meter box of claim 8, wherein the extension assembly of the second coupling includes a collar, a portion of which is spaced apart from the neck with a slot located therebetween, wherein a portion of the coupling body of the second coupling is located within the slot.

10. The meter box of claim 4, wherein a slot is located about the outer surface of the neck, and wherein the O-ring is located within that slot and engages the inner surface of the coupling body.

11. The meter box of claim 1, wherein the first coupling includes a valve assembly.

12. The meter box of claim 1, wherein the second coupling includes a valve assembly.

13. A meter box comprising:
a first coupling;
wherein the first coupling is located adjacent the meter box; and
a second coupling;
wherein the second coupling is located adjacent the meter box;
wherein the first coupling includes a coupling body;
wherein the first coupling includes an extension assembly;
wherein the extension assembly includes a neck that is in fluid communication with the coupling body;
wherein the neck of the extension assembly is movable with respect to the coupling body and configured to selectively create a space; and
wherein the space is sufficient to allow a fluid meter to be installed or removed between the first coupling and the second coupling.

14. The meter box of claim 13, wherein the second coupling extends from interior to exterior of the meter box opposite the first coupling.

15. The meter box of claim 13, wherein the first coupling extends from interior to exterior of the meter box.

16. The meter box of claim 15, wherein ends of each of the first coupling and the second coupling form the space therebetween within the meter box configured and sized sufficient to receive the fluid meter.

17. The meter box of claim 13, wherein the extension assembly includes a collar, a portion of which is spaced apart from the neck with a slot located therebetween, and wherein a portion of the coupling body is located within the slot.

18. The meter box of claim 17, wherein the portion of the coupling body located within the slot includes a tab that engages a snap ring when a predetermined distance has been reached.

19. A meter box comprising:
a first coupling;
wherein the first coupling is located adjacent the meter box;
wherein the first coupling includes a coupling body;
wherein the first coupling includes an extension assembly;
wherein the extension assembly includes a neck that is in fluid communication with the coupling body;
wherein the neck of the extension assembly is movable with respect to the coupling body and configured to selectively create a space;
wherein the extension assembly includes a collar, a portion of which is spaced apart from the neck with a slot located therebetween, wherein a portion of the coupling body is located within the slot; and
wherein the space is sufficient to allow a fluid meter to be installed or removed between the first coupling and the second coupling.

20. The meter box of claim 19, further comprising a second coupling located adjacent the meter box.

* * * * *